Sept. 7, 1965 E. H. SPOUGE 3,205,004
DOOR JAMB MOUNTED SAFETY HARNESS
Filed July 17, 1963
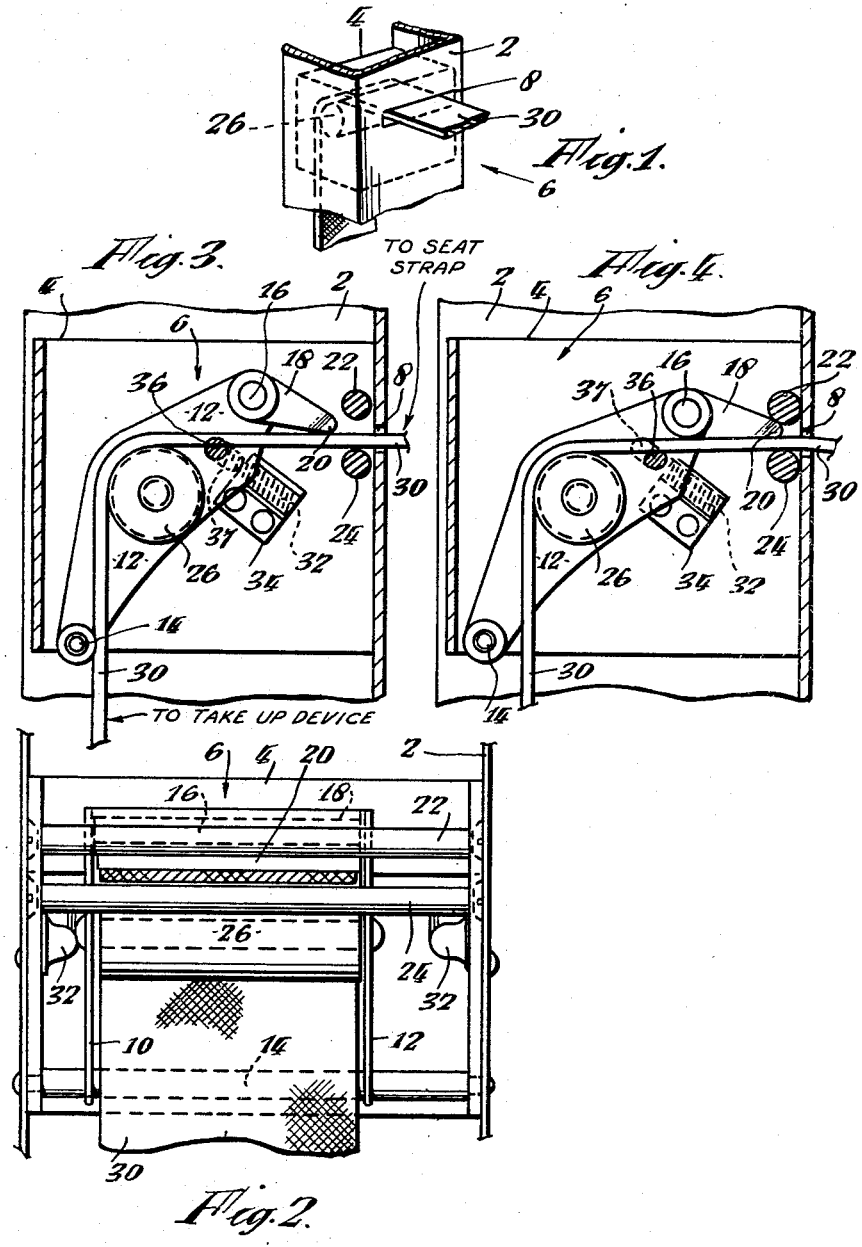

3,205,004
DOOR JAMB MOUNTED SAFETY HARNESS
Eric Herbert Spouge, Harold Hill, England, assignor to Pacific Scientific Company, San Francisco, Calif., a company of California
Filed July 17, 1963, Ser. No. 295,649
Claims priority, application Great Britain, July 26, 1962, 28,764/62
4 Claims. (Cl. 297—388)

This invention relates to safety harness such as is used in aircraft or other vehicles in association with a seat for the purpose of protecting the wearer from being thrown against any part of the vehicle in the event of an accident such as a collision. The invention applies to safety harness of the kind including a strap adapted to be secured diagonally across the body of the wearer.

With safety harness of the kind described it has been the practice hitherto for the upper end of the strap to be secured to the door pillar or other structural member of the vehicle and the lower end to carry one element of a buckle the other element of which has a strap secured by its end to the floor or seat of the vehicle, some means of adjustment being provided in one of the straps. In some cases a lap strap has been provided which is incorporated with the harness and attached to the same buckle.

According to the present invention there is provided a safety harness device for securing to a door pillar or jamb of a vehicle and through which the upper end of said harness strap is adapted to be passed before being secured to a take up device said safety harness device including locking means associated with said strap which locking means is brought into the locked position on a sudden pull being exerted on said strap. Said locking means may include wedging means adapted to engage directly with the strap to wedge it against a fixed abutment.

Referring to the drawings filed with the application:

FIG. 1 is a diagrammatic perspective fragmentary view of a car door pillar to which the invention has been applied.

FIG. 2 is a diagrammatic fragmentary front elevation of one form of safety harness device shown in FIG. 1.

FIG. 3 is a diagrammatic side elevation of FIG. 2 looking in the direction of the arrow.

FIG. 4 is a similar view to FIG. 3 showing the parts in the locked position.

In the form shown the hollow door pillar jamb 2 is of channel section in which is mounted the frame 4 of the safety harness device indicated generally by the numeral 6. The pillar 2 is pierced with an aperture 8 behind which the harness device 6 is mounted.

The frame which is of channel section 4 houses two levers 10 and 12 mounted on pivots 14 rivetted in the sides of the frame 4. The free ends of the levers 10 and 12 are rigidly connected by a bar 16 on which is pivotally mounted a wedge-shaped member 18 having a nose 20 constituting the wedging means. Mounted one above the other in the front of the frame 4 are two round section bars 22 and 24. The nose 20 is adapted to enter the gap between the stop bars or members 22 and 24. The frame 4 is mounted in the pillar 2 so that the open side of the frame 4 is closed by the channel pillar 2. A roller 26 is journalled by its ends in the levers 10 and 12. A strap 30 of which only a fragment is seen is shown passing through the aperture 8 in the pillar 2 between the stop bars 22 and 24, under the wedge 18, over the roller 26 and down inside the pillar 2. At each side of the frame 4 is mounted a compression spring 32 one end of which is secured to the frame 4 by a bracket 34 and the other end is connected to the levers 10 and 12 respectively by a pin 36 whose end is engaged in a slot 37 in the frame 4.

Assuming that the vertical run of the strap 30 is attached to a take up device (not shown) while the other is adapted to be secured to the buckle of a seat strap passing over the body of the wearer, the device functions as follows:

On being seated the passenger in the vehicle reaches up takes hold of the end of the strap 30 which in the rest position has been withdrawn into the pillar 2 until only a small portion remains outside and pulls the strap down engaging the end with the buckle of a seat strap, the strap 30 then lying diagonally across the chest of the passenger. The device is such that the passenger is still free to move provided he makes such movements slowly. If he were to move too quickly the sudden pull on the strap 30 will result in the levers 10 and 12 being rocked about their pivots 14 bringing the nose 20 of the wedge 18 between the stop bars or members 22 and 24 wedging the strap 30 against the lower bar 24 thus locking the strap 30 against further withdrawal since any further movement of the strap will only increase the wedging action.

What I claim and desire to secure by Letters Patent is:

1. A safety harness for retaining a seat occupant in his seat in a vehicle having an entrance door with a hollow door jamb comprising, a safety harness device having a controlling portion mounted within the hollow door jamb of the vehicle, said harness device comprising pivoted lever means, a roller carried by said lever means, a strap associated with said lever means passing over said roller and extending outwardly through an opening in the door jamb for connecting to the occupant's seat belt, stop means carried by said door jamb and locking wedging means carried by said lever means and actuated by a sudden pull on said strap due to rapid movement of the occupant's body with respect to his seat to cause the locking of said strap by said wedging means against said stop means and stopping further outward movement thereof from said door frame, thereby retaining the occupant in his seat.

2. A safety harness for retaining a seat occupant in his seat in a vehicle having an entrance door with a hollow door jamb comprising a safety harness device having a controlling portion mounted within the hollow door jamb, said harness device controlling portion comprising lever means pivotally supported on said door jamb, a roller carried by and turnable with respect to said lever means, a strap associated with said lever means and passing over said roller for extending outwardly through an opening in the door jamb for connection with the seat occupant's seat strap, and locking means comprising a wedge member carried by said lever means and actuated by a sudden pull on said strap due to rapid movement of the occupant's body with respect to his seat resulting in turning movement of said lever means to cause said wedge member to bind against said strap and effect the locking of the same by said locking means against further outward movement from said door jamb, thereby retaining the occupant in his seat.

3. A safety harness device according to claim 2 wherein said wedge member is a lever formed with a wedging nose portion.

4. A safety harness device according to claim 3 wherein said wedging nose portion is pivotally supported on said lever means and two fixed abutments are operatively associated with said nose portion for wedging said strap against one abutment while supported by the other.

References Cited by the Examiner

UNITED STATES PATENTS

| | | | |
|---|---|---|---|
| 2,071,903 | 2/37 | Shively | 297—388 |
| 2,705,529 | 4/55 | Bull | 297—386 |
| 2,825,581 | 3/58 | Knight | 297—388 |
| 2,864,437 | 12/58 | Spring | 297—389 |
| 2,891,804 | 6/59 | Frayne | 297—389 |
| 2,898,976 | 8/59 | Barecki | 280—150 |
| 2,971,730 | 2/61 | Martin | 297—388 |
| 3,043,625 | 7/62 | Bohlin | 297—389 |
| 3,061,331 | 10/62 | Lantis | 297—385 |

FRANK B. SHERRY, *Primary Examiner.*